United States Patent
Bottesch et al.

(10) Patent No.: US 7,111,969 B2
(45) Date of Patent: Sep. 26, 2006

(54) VEHICLE LAMP

(75) Inventors: Rainer Bottesch, Stuttgart (DE); Otto Rolf Müller, Gruibingen (DE)

(73) Assignee: Schefenacker Vision Systems Germany GmbH, Schwaikheim (DE)

( * ) Notice: Subject to any disclaimer, the term of this patent is extended or adjusted under 35 U.S.C. 154(b) by 0 days.

(21) Appl. No.: 10/691,062

(22) Filed: Oct. 22, 2003

(65) Prior Publication Data

US 2004/0120157 A1 Jun. 24, 2004

(30) Foreign Application Priority Data

Oct. 22, 2002 (DE) ................ 102 49 113

(51) Int. Cl.
  *F21V 5/00* (2006.01)
  *F21V 7/00* (2006.01)
(52) U.S. Cl. ............ 362/517; 362/299; 362/302; 362/304; 362/309; 362/328; 362/346; 362/520
(58) Field of Classification Search ........ 362/296–311, 362/327–329, 331, 341, 346–350, 507–509, 362/511, 514, 516–522, 800, 487, 540–545
See application file for complete search history.

(56) References Cited

U.S. PATENT DOCUMENTS

| 4,628,422 | A | * | 12/1986 | Ewald | 362/240 |
| 4,729,076 | A | * | 3/1988 | Masami et al. | 362/235 |
| 5,136,483 | A | * | 8/1992 | Schoniger et al. | 362/545 |
| 5,707,130 | A | * | 1/1998 | Zwick et al. | 362/517 |
| 6,356,394 | B1 | * | 3/2002 | Glienicke | 359/641 |
| 6,366,409 | B1 | * | 4/2002 | Umemoto et al. | 359/628 |
| 6,447,155 | B1 | * | 9/2002 | Kondo et al. | 362/545 |
| 6,485,170 | B1 | * | 11/2002 | Natsume | 362/509 |
| 6,558,032 | B1 | * | 5/2003 | Kondo et al. | 362/516 |
| 6,598,998 | B1 | * | 7/2003 | West et al. | 362/307 |
| 6,755,556 | B1 | * | 6/2004 | Gasquet et al. | 362/329 |
| 6,773,154 | B1 | * | 8/2004 | Desai | 362/541 |
| 2003/0189828 | A1 | * | 10/2003 | Coushaine | 362/226 |
| 2004/0027833 | A1 | * | 2/2004 | Amano et al. | 362/507 |

FOREIGN PATENT DOCUMENTS

DE   195 47 861 A1   6/1997

* cited by examiner

*Primary Examiner*—Sandra O'Shea
*Assistant Examiner*—Jason Han
(74) *Attorney, Agent, or Firm*—Warn, Hoffmann, Miller & LaLone, P.C.

(57) ABSTRACT

An automotive tail light. An LED emits its light laterally. A reflection part surrounding the LED picks up the light and reflects it towards the light dish. A low height light is thus provided.

26 Claims, 3 Drawing Sheets

VEHICLE LAMP

FIELD OF THE INVENTION

The present invention relates to a lamp, in particular a tail light, for vehicles, preferably motor vehicles.

BACKGROUND OF THE INVENTION

In a known lamp of this kind (DE 195 47 861), an incandescent lamp is arranged in the housing behind the light disk in a larger chamber and an LED behind a light-conducting element in a smaller chamber. The LED emits towards the light disk. The reflection part is arranged in front of the LED. Hence, the lamp has a corresponding structural depth.

SUMMARY OF THE INVENTION

An object of the invention is so to configure a lamp of this kind that it will have but little structural depth and a high optical efficiency.

In the lamp according to the invention, the LED emits its light to a large extent laterally. The reflection part surrounding the LED picks up this light completely and reflects it towards the light disk of the lamp. The height of the reflection part can, therefore, correspond to the height of the LED. As a result, the reflection part and hence the lamp has but little structural height, so that the lamp can be accommodated in flat installation spaces without problems. Even so, an optimal emission of light is achieved, since the reflection part picks up almost 100% of the quantity of light emitted by the LED and reflects it towards the light disk. Furthermore, it will suffice to use only a single LED. Hence, the lamp can be simply and economically produced.

Other features of the invention will appear from the additional claims, the description of the figures, and the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
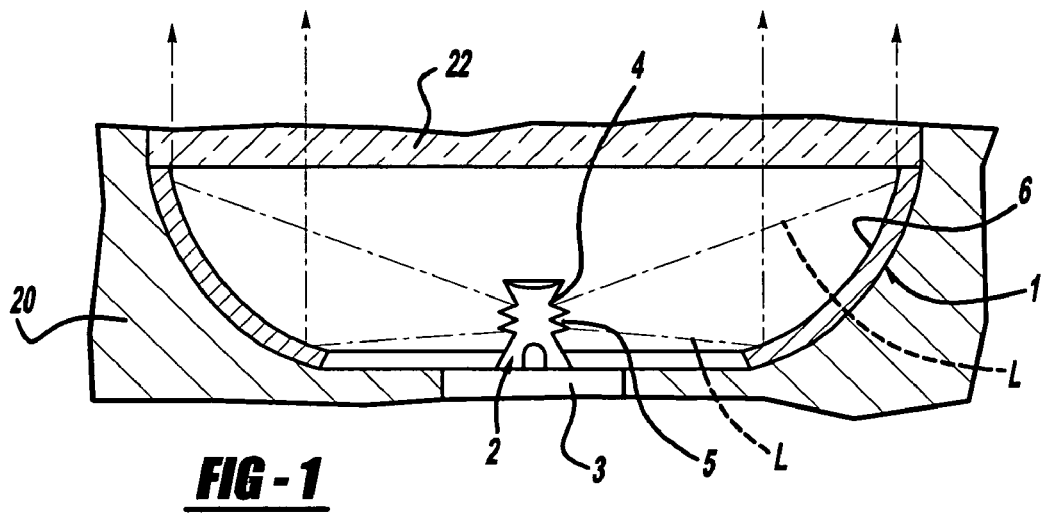
FIG. 1 shows a part of a lamp according to the invention having a luminous medium and a reflector in axial section.

FIG. 1 shows part of a motor vehicle tail light having a parabolic reflector 1, at the focus of which the luminous means 2, in the form of an LED 2, is arranged. The reflector 1 and the LED 2 are provided in a housing 20 of the tail light, having a housing aperture closed in known manner with a light disk 22 through which the light exits to the outside. The light disk 22 is a transparent material designed to allow light to pass through while protecting the reflector 1 and LED 2 from the outside environment. The LED 2 is seated on a base 3 held to the housing. The LED 2 has a conducting element 4 more or less in the shape of a double cone, and encircling ribs 5 projecting outward at half-height, at which the light rays L leaving the LED 2 are so deflected laterally that almost all of the light is emitted laterally. Such LEDs are known and, therefore, need not be described in more detail. The reflector 1 is drawn up so far that all light rays L reach the inside 6 of the reflector and are reflected to the light disk 22 of the lamp. In the embodiment by way of example, the light rays L are reflected parallel to each other and impinge on the light disk 22 perpendicularly.

The reflector surface 6 is of smooth configuration. Alternatively, however, it may exhibit so-called cushion and/or roller structure, at which the incident rays L are scattered. Again, it is possible to arrange an optical disk in the region between the reflector and the light disk 22.

Since the LED 2 emits light laterally only, the reflector 1 may be of flat construction. Thus, an optimal light yield of nearly 100% is possible. The LED 2 has a long life, is inexpensive, and develops but little heat as a rule.

Figure 2:
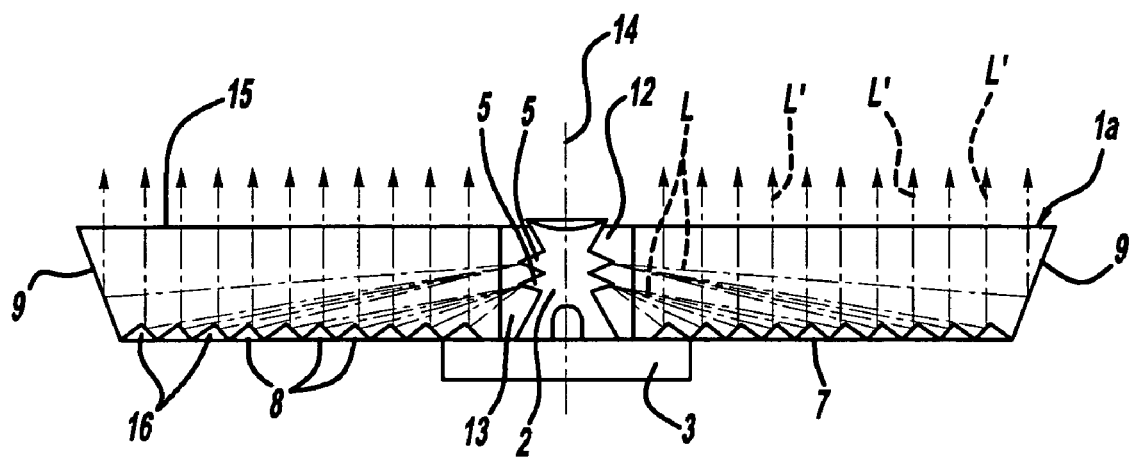
FIG. 2 shows an alternate embodiment of a lamp in accordance with the present invention.

As shown in FIG. 2, instead of a reflector, a light-directing element 1a may be provided. The LED 2 is seated in its central aperture 12. The light-directing element 1a has a circular outline with little thickness. The LED 2 projects only slightly beyond the light-directing element 1a. The ribs 5 of the LED are of such configuration that they deflect the light rays L obliquely downward at a flat angle. The light rays L exiting beyond the compass of the two ribs 5 in accordance with the previous embodiment enter the light-directing element 1a and arrive at the reflection surfaces 8 extending annularly about the axis 14 of the light-directing element 1a and enclosing an acute angle opening towards the light exit side 15 of the element with the axis 14. The reflection surfaces 8 lie parallel to each other and are connected to each other by annular surfaces 16 inclined contrary to them. The reflection and annular surfaces 8, 16 are provided on the underside 7 of the light-directing element 1a opposed to the light exit side 15, which element 1a is of trapezoidal cross-section. The light exit side 15 has a greater diameter than the underside 7.

The light rays L emanating from the LED 2 are so reflected at the reflection surfaces 8 that they exit parallel to each other perpendicularly from the light exit side 15 of the light-directing element 1a. The reflection surfaces 8 may alternatively be so arranged and configured that the light rays L do not run parallel to each other after reflection.

In this embodiment, essentially all of the light emanating from the LED 2 is picked up by the light-directing element 1a. It also has little thickness, corresponding substantially to the height of the LED 2. The light-directing element 1a is, therefore, eminently suitable if little installation depth is available.

Figure 3:
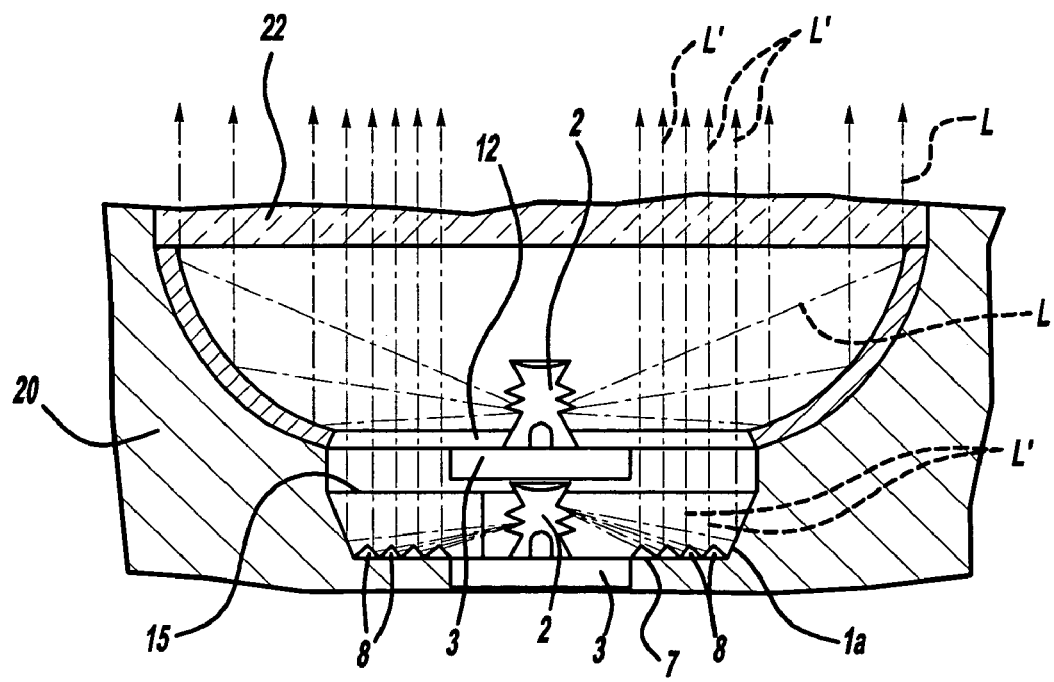
FIG. 3 shows a further alternative embodiment of a lamp in accordance with the present invention.

As FIG. 3 shows, the light-directing element 1*a* according to FIG. 2 may be combined with a reflector 1 in beam direction, at the level of a central aperture 12 through which the LED 2 projects. The diameter of this aperture 12 matches the diameter of the light-directing element 1*a* on the light exit side 15.

The LED 2 of the light-directing element 1*a* is located behind the LED 2 of the reflector 1. The reflection surfaces 8 of the element 1*a* are so arranged that the light L' coupled into the light-directing element 1*a* from the LED 2 reaches through the aperture 12 of the reflector 1. The rays of light L, L' run parallel to each other towards the light disk of the lamp. In this way, the light disk 22 is optimally and uniformly deflected.

The LED 2 of the light-directing element 1*a* with base 3 is so arranged with respect to the reflection surfaces 8 that the light rays L' emitted by the LED reach the reflection surfaces 8 without hindrance by the base 3. The reflection surfaces 8 in turn are so arranged that the rays of light reflected by them will pass by the base 3 of the LED of the reflector 1.

The LEDs 2 may emit light of the same or different color. For example, one LED 2 may emit red and the other LED 2 yellow. Such a configuration is provided when the two LEDs 2 are employed for the brake light and the blinker. The two LEDs 2 are then actuated according to the desired signal function. Alternatively, of course, both LEDs may emit red or both yellow, to enhance the intensity. Alternatively again, the LEDs 2 may be used for the closure light, the fog light or the reverse light. In that case, the LEDs will emit the appropriate hue.

Figure 4:
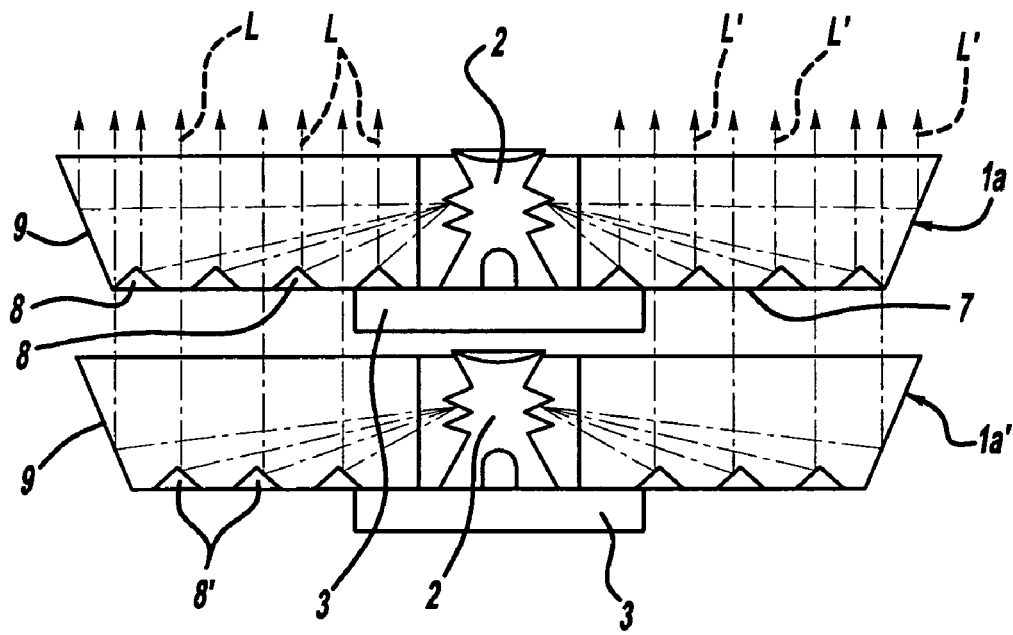
FIG. 4 shows another alternative embodiment of a lamp in accordance with the teachings of the present invention.

FIG. 4 shows an embodiment in which the two light-directing elements 1*a*, 1*a'* are closely spaced one behind the other. The two light-directing elements 1*a*, 1*a'* are of essentially the same configuration as the light-directing element 1*a* according to FIG. 2. The reflection surfaces 8 on the underside 7 are spaced farther from each other than in the embodiment of FIG. 2. The reflection surfaces 8' of the light-directing element 1*a* are spaced farther apart than the reflection surfaces 8, and are so arranged relative to these reflection surfaces that the rays L' emanating from the bottom light-directing element 1*a'* exit between the rays L of the top light-directing element 1*a*. In the region where the light rays L' of the light-directing element 1*a'* reach the underside 7 of the top light-directing element 1*a*, there are no reflection surfaces 8. The rays L' impinge perpendicularly on the underside 7 of the light-directing element 1*a* and pierce it, emerging perpendicularly from the light exit side 15 of the light-directing element 1*a*. Thus, in simple manner, a uniform intensive emission is assured. Since both light-directing elements 1*a*, 1*a'* have but little thickness, the corresponding lamp is distinguished also by a small structural height. The LEDs 2 may emit light of like or unlike color.

In the embodiment according to FIG. 4, an additional light-directing element (not shown) may be provided, or similar configuration to the other two light-directing elements 1*a*, 1*a'*. The reflection surfaces of this additional light-directing element are so arranged relative to the reflection surfaces 8, 8' that the rays reflected by them pass between the rays L,L' of the other two light-directing elements 1*a*, 1*a'*. The underside 7' of the light-directing element 1*a'* is even in the region of these perpendicularly incident rays. Thus, an additional enhancement of intensity can be achieved. Besides, all three LEDs may then be of different colors, so that the corresponding lamp may, for example, comprise a brake light, a closure light and a blinker.

Figure 5:
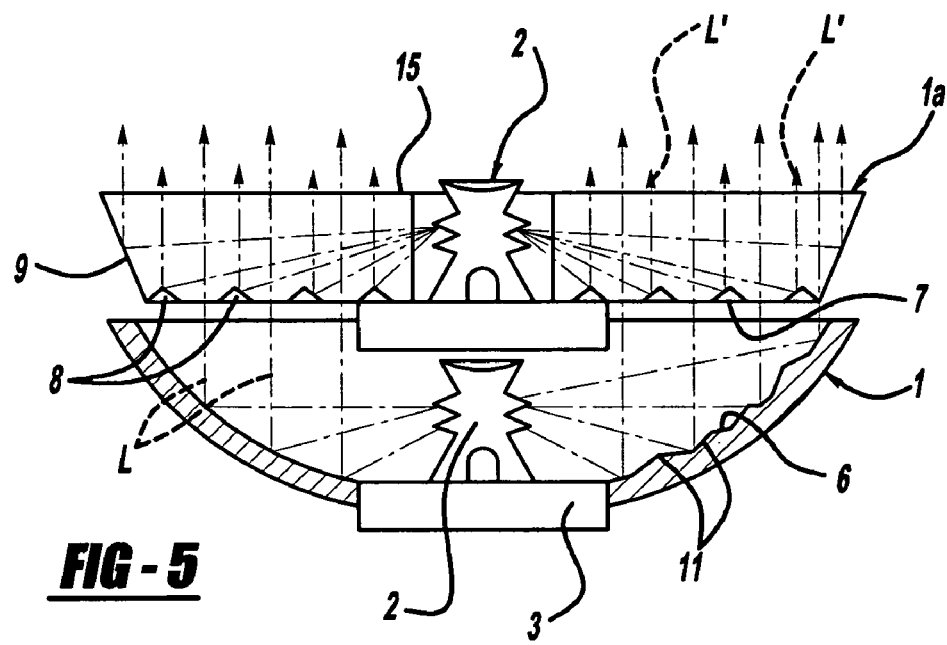
FIG. 5 shows a still further alternative embodiment of the teachings of the present invention.

FIG. 5 shows an embodiment in which the reflector 1 is arranged behind the light-directing element 1*a* in beam direction. The LED 2 and the reflector 1 itself are so configured and arranged relative to each other that the rays L reflected from the reflector surface 6 pass between the reflection surfaces 8 of the light-directing element 1*a*. In the region of the rays L' impinging perpendicularly on the underside 7 of the light-directing element 1*a*, no reflection surfaces 8 are provided. The light rays L traverse the light-directing element 1*a* and emerge perpendicularly from its light exit side 15.

The reflector surface 6 of the reflector 1 may, as shown in the left-hand half, be of smooth configuration. Alternatively, however, as shown in the right-hand half of FIG. 5, it may be provided with optics 11, for example in the form of roller or cushion optics.

With light-directing element 1,1*a* located one close behind the other, a high intensity of light is achieved. The reflector 1 and the light-directing element 1*a* are of substantially the same diameter, and each of but little height.

Figure 6:
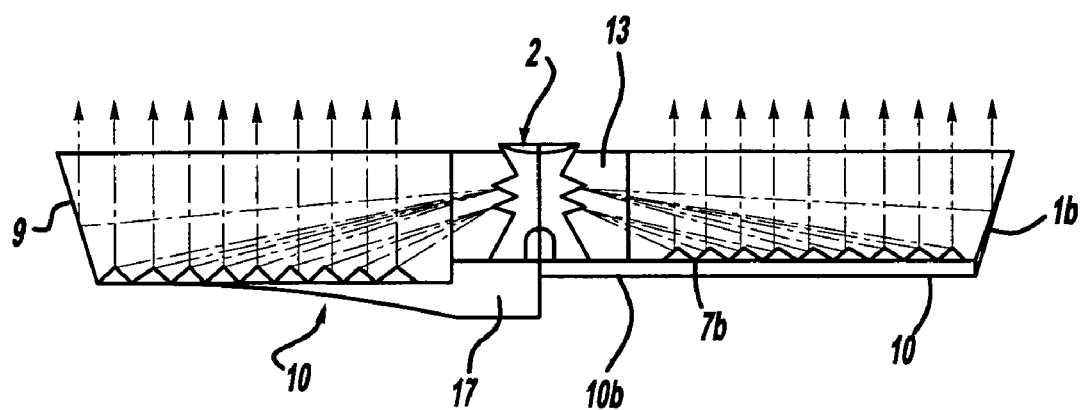
FIG. 6 shows an additional alternative embodiment of the present invention.

The light-directing element 1*b* according to FIG. 6 largely corresponds to the light-directing element 1*a* according to FIG. 2. It differs from the latter in that, on the underside 7*b*, a cooling member 10, 10*b* is provided. FIG. 6 shows two embodiments, by way of example, of a cooling member. In the right-hand half of FIG. 6, the cooling member 10*b* is disk-shaped, covering the entire underside 7*b* of the light-directing element 1*b*. Alternatively, as shown in the left-hand half of FIG. 6, the cooling member 10 may be of thickened configuration in the central portion 17 underneath the LED 2. This cooling member region 17 has the same diameter as the opening 12 in which the LED 2 is located. Starting out from the cooling member region 17, the thickness of the cooling member 10 diminishes as far as the outer edge of the underside 7. This diminution of thickness may be continuous or else, as shown in FIG. 6, first greater and then less towards the outer edge. In the region of the LED 2 where the greatest evolution of heat occurs, the heat can be reliably carried off by the cooling member of the region 17.

Incidentally, the light-directing element 1*b* is of like configuration as the embodiment according to FIG. 2. The cooling member may of course alternatively be provided in the embodiments according to FIGS. 3 to 5.

The light-directing elements 1*a*,1*a'*,1*b* may advantageously consist of polymethyl methacrylate. The side wall 9 of the light-conducting elements 1*a*,1*a'*,1*b* is advantageously provided with a reflection layer by vapor deposition, so that the light rays cannot exit from the light-directing elements 1*a*,1*a'*,1*b* laterally.

Instead of the ribbed LEDs represented and described, unribbed LEDs may be employed, likewise emitting the light laterally. Such LEDs are known and, therefore, are not described in more detail.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A lamp for a motor vehicle comprising:
   a housing in which at least one light source is arranged, wherein said at least one light source is an LED;
   a light-conducting element having a double-cone shape, which surrounds said LED, causing light emitting from said LED to be emitted in a lateral direction; and
   at least one reflection part associated with said light source, wherein said at least one reflection part adjoins and surrounds said LED in the same plane and has a height that is less than or equal to said light-conducting element.

2. The lamp according to claim 1, wherein the reflection part further comprises an annular reflector.

3. The lamp according to claim 2, wherein the reflector comprises a parabolic configuration.

4. The lamp according to claim 2, wherein the LED is arranged at the focus of the reflector.

5. The lamp according to claim 2, wherein the reflector is provided with optics located on a reflector surface.

6. The lamp according to claim 1, wherein the reflection part comprises a light-directing element.

7. The lamp according to claim 6, wherein the light-directing element has a circular outline and, at least one light exit side.

8. The lamp according to claim 6, wherein the light-directing element comprises a central aperture in which the LED is located.

9. The lamp according to claim 6, wherein the light-directing element comprises reflection surfaces reflecting the light emitted by the LED to a light exit surface.

10. The lamp according to claim 9, wherein the reflection surfaces are provided coaxial to the LED.

11. The lamp according to claim 9, wherein the reflection surfaces are provided on an underside of the light-directing element, opposed to the light exit surface.

12. The lamp according to claim 6, wherein the outside of the light-directing element is provided with at least one reflection layer, applied by vapor deposition.

13. The lamp according to claim 1, wherein at least two reflection parts are arranged closely spaced one behind another in the beam direction of the LED of each said reflection part.

14. The lamp according to claim 13, wherein one reflection part comprises an annular reflector and the other reflection part comprises a light-directing element.

15. The lamp according to claim 14, wherein the annular reflector is located ahead of the light-directing element in beam direction.

16. The lamp according to claim 15, wherein the annular reflector comprises a passage opening to admit the rays of light to the light-directing element.

17. The lamp according to claim 14, wherein the light-directing element further comprises two or more reflection surfaces configured in the light-directing element, and the annular reflector is located behind the light-directing element in beam direction and light emitted from an LED in front of said light-directing element passes through said light-directing element between the two or more reflection surfaces, and light emitted from an LED positioned between said annular reflector and behind said light-directing element contacts said annular reflector.

18. The lamp according to claim 17, further comprising the two or more reflection surfaces configured in the light-directing element so that the rays reflected by the annular reflector enter the light-directing element between the two or more reflection surfaces.

19. The lamp according to claim 18, wherein the light rays from the annular reflector impinge perpendicularly on the underside of the light-directing element.

20. The lamp according to claim 13, wherein two light-directing elements are arranged one behind the other in beam direction.

21. The lamp according to claim 20, further comprising two or more reflection surfaces configured in the anterior light-directing element so that the rays of light reflected from the rearward light-directing element enter the anterior light-directing element in the region between the two or more reflection surfaces.

22. The lamp according to claim 21, wherein the light rays of the rearward light-directing element impinge perpendicularly on the underside of the anterior light-directing element.

23. The lamp according to claim 13, wherein the LEDs of the reflection parts arranged one behind another emit the same chromatic hue.

24. The lamp according to claim 13, wherein the LEDs of the reflection parts arranged one behind another emit different chromatic hues.

25. The lamp according to claim 1, wherein an underside of the reflection part has at least one cooling member provided.

26. The lamp according to claim 25, wherein the cooling member at least partially covers the underside of the reflection part.

* * * * *